(12) United States Patent
Temkin et al.

(10) Patent No.: US 6,493,487 B1
(45) Date of Patent: Dec. 10, 2002

(54) OPTICAL WAVEGUIDE TRANSMISSION DEVICES

(75) Inventors: Henryk Temkin, Ransom Canyon; Rudolf Feodor Kazarinov, Lubbock, both of TX (US)

(73) Assignee: Applied WDM, Inc., Lubbock, TX (US)

(*) Notice: Subject to any disclaimer, the term of this patent is extended or adjusted under 35 U.S.C. 154(b) by 0 days.

(21) Appl. No.: 09/616,487

(22) Filed: Jul. 14, 2000

(51) Int. Cl.$^7$ .............. G02B 6/34; G02B 6/28
(52) U.S. Cl. .............. 385/37; 385/24; 385/46; 385/43
(58) Field of Search .............. 385/14, 16, 24, 385/37, 43, 50–51, 46, 47

(56) References Cited

U.S. PATENT DOCUMENTS

| | | | |
|---|---|---|---|
| 4,153,330 A | 5/1979 | Tomlinson, III | 350/96.17 |
| 4,262,995 A | 4/1981 | Tangonan | 350/96.16 |
| 5,002,350 A | 3/1991 | Dragone | 350/96.15 |
| 5,039,993 A | 8/1991 | Dragone | 343/776 |
| 5,136,671 A | 8/1992 | Dragone | 385/46 |
| 5,208,882 A | 5/1993 | Strasser et al. | 385/37 |
| 5,243,672 A | 9/1993 | Dragone | 385/46 |
| 5,450,511 A | 9/1995 | Dragone | 385/37 |
| 5,467,418 A | 11/1995 | Dragone | 385/37 |
| 5,473,714 A | 12/1995 | Vengsarkar | 385/43 |
| 5,546,483 A * | 8/1996 | Inoue et al. | 385/14 |
| 5,668,900 A | 9/1997 | Little et al. | 385/37 |
| 5,675,675 A | 10/1997 | Trouchet | 385/24 |
| 5,710,849 A | 1/1998 | Little et al. | 385/50 |
| 5,745,616 A | 4/1998 | Zirngibl | 385/37 |
| 5,822,481 A | 10/1998 | Mestric | |
| 5,841,919 A | 11/1998 | Akiba et al. | 385/37 |
| 5,845,022 A | 12/1998 | Doerr | 385/24 |

(List continued on next page.)

FOREIGN PATENT DOCUMENTS

| | | | |
|---|---|---|---|
| EP | 0444817 A | 9/1991 | |
| EP | 0613263 A | 8/1994 | |
| JP | 1-134627 A | 5/1989 | |
| JP | 5313029 A2 | 11/1993 | G02B/6/12 |
| JP | 11160556 A2 | 6/1999 | G02B/6/12 |
| JP | 2000-180641 A | 6/2000 | |
| WO | WO 00/41015 A | 7/2000 | |

OTHER PUBLICATIONS

Okayama et al: "Reflective waveguide array demultiplexer in LiNbO3"; Journal of Lightwave Technology, vol. 14, No. 6, Jun. 1, 2001, pp. 985–990.

Soole, J B D et al: "Compact polarisation independent InP reflective arrayed waveguide grating filter"; Electronic Letters, IEE, vol. 32, No. 19, pp. 1769–1771.

International Search Report PCT/US 01/21388 Jul. 30, 2002.

Primary Examiner—Hemang Sanghavi
Assistant Examiner—Omar Rojas, Jr.
(74) Attorney, Agent, or Firm—Sharp, Comfort & Merrett, P.C.

(57) ABSTRACT

An optical waveguide device comprising a free space region, suitably provided by a slab waveguide, having optical signal ports for coupling to input and output waveguide sections and an optical waveguide grating including an array of grating waveguides coupling the free space region to a reflector surface to provide a folded structure. Dielectric waveguide structures are preferred. The grating includes tapered optical waveguide sections laterally spaced and optically isolated from each other which extend from the free space region, with the grating waveguides continuing as extensions of the tapered waveguide sections. Each of the grating waveguides differs in length from a neighboring grating waveguide by a constant increment, preferably an optical path length increment. The grating waveguides also include intermediate curved portions having respective curvatures which increase progressively, preferably in an approximately parabolic manner, according to the sequential location of the grating waveguides from a reference grating waveguide in the array.

33 Claims, 4 Drawing Sheets

U.S. PATENT DOCUMENTS

| | | | |
|---|---|---|---|
| 5,887,103 A | 3/1999 | Jeong et al. | 385/122 |
| 5,920,663 A | 7/1999 | Dragone | 385/15 |
| 5,926,587 A | 7/1999 | Chen | 385/14 |
| 5,943,452 A | 8/1999 | Himeno et al. | |
| 5,982,960 A | 11/1999 | Akiba et al. | 385/24 |
| 6,014,482 A | 1/2000 | Laude | 385/31 |
| 6,023,480 A | 2/2000 | Dragone | 372/23 |
| 6,023,544 A | 2/2000 | Dragone | |
| 6,049,640 A | 4/2000 | Doerr | |
| 6,069,990 A | 5/2000 | Okawa et al. | |
| 6,112,000 A * | 8/2000 | Bergmann et al. | 385/47 |
| 6,141,152 A * | 10/2000 | Trouchet | 359/634 |
| 6,181,849 B1 * | 1/2001 | Lin et al. | 385/24 |

* cited by examiner

OPTICAL WAVEGUIDE TRANSMISSION DEVICES

CROSS-REFERENCES TO RELATED APPLICATIONS

This application describes and claims subject matter that is also disclosed in application Ser. No. 09/616,816, entitled "Optical Waveguide Slab Structures", and in application Ser. No. 09/616,945, entitled "Optical Waveguide Gratings", both assigned to the assignee of the present application and both filed on even date herewith, all three applications having common inventorship entities.

FIELD OF THE INVENTION

This invention relates to optical waveguide transmission devices and more particularly to optical waveguide devices suitable, for example, for employment in optical multiplexer and demultiplexer, and router applications employing Wavelength Division Multiplexing (WDM) which may find application in optical fiber based communication networks.

BACKGROUND OF THE INVENTION

Increasingly, state-of-the-art optical transmission devices for wavelength division multiplexing utilize waveguide gratings. In a typical device structure a waveguide grating may be placed between input and output slab waveguides. Multi-wavelength light from a point source, the end of the input waveguide, is transmitted through the grating and different individual wavelengths are focused on different points of the output waveguide surface. The grating itself may include a number of different physical length waveguides with a constant length increment. This results in a wavefront rotating with the wavelength change. The grating can be also used to focus an output waveform and to collimate an input waveform. For this purpose the ends of the grating may be located on a circular surface provided by each slab waveguide, at which the waveguides are located close to each other to assure strong coupling needed for high efficiency. However, in the grating itself, coupling between individual waveguides is not desirable, so that the waveguides are spaced relatively far apart from each other. This implies a relatively large grating structure. In an optical multiplexer, multi-wavelength light from a point source, the end of the input waveguide, is transmitted through the grating and different individual wavelengths are focused on different points of the output waveguide surface.

Close coupling between waveguides, at the interface between the slab waveguide and the grating, has typically been considered essential to the efficiency of the device. To alleviate concerns about resulting aberrations, it has been proposed to position the foci of interface arcs between the input waveguide and the slab region, and the slab region and the waveguide grating, some distances from the arcs themselves. This approach of positioning the focal points of the arc boundary (center of the interface arc) away from the opposite arc, originating from the desire to maintain strong coupling, has continued. The emphasis on strong coupling was consistent with grating based multiplexer designs for handling a small number of channels (for example, 1×4 to 1×8) and high efficiency, i.e. low transmission loss.

Another desideratum in multiplexer design is a compact device, and in particular a compact waveguide grating section. This is driven by cost reduction associated with reduced size, as well as lower sensitivity to material non-uniformities. One approach addressing the compactness issue has been to introduce a reflector in the grating section. Possible reflecting arrangements include waveguide Bragg reflectors and mirrors, including mirrors with stepped surfaces. However, such approaches have only partially addressed the overall issue of compactness and transmission efficiency.

SUMMARY OF THE INVENTION

The present invention addresses these concerns by providing an optical waveguide device comprising a free space region having a plurality of optical signal ports for coupling to input and output waveguide sections and an optical waveguide grating including an array of laterally spaced grating waveguides coupling the free space region to a reflector surface to provide a folded structure. The optical waveguide grating includes tapered optical waveguide sections laterally spaced apart from each other and extending from the free space region, each of the tapered optical waveguide sections having a wider end adjacent to the free space region and an opposite, narrower end extending to a respective one of the array of optical grating waveguides extending between the narrower ends of the tapered optical waveguide sections and the reflector surface. Each of the grating waveguides differs in length from a neighboring grating waveguide by a constant increment, preferably an optical path length increment. The grating waveguides also include intermediate curved portions having respective curvatures which increase progressively according to the sequential location of the grating waveguides from a reference grating waveguide in said array.

An advantageous feature of the invention is that the tapered waveguide sections and the grating waveguides are laterally spaced apart sufficiently to provide optically isolated transmission paths for light waves between said free space region and said reflector surface. The tapered waveguide sections can be suitably configured to enhance collection of light waves transmitted across the free space region and to separate the collected light waves into optically isolated paths, even at the interface between the wider ends of the tapered waveguide sections and the free space region.

The free space region preferably has arcuate first and second end surfaces. The optical signal extend radially from the arcuate first end surface and the tapered waveguide sections extend radially from the arcuate second end surface. Advantageously, the arcuate first end surface has a radius of curvature originating on the arcuate second end surfaces, and said arcuate second end surface has a radius of curvature originating on the first arcuate end surface.

In the waveguide grating section, the curved portions of the grating waveguides preferably have radii of curvature that decrease in an approximately parabolic manner as the numerical sequential location of a said curved portion increases from an intermediate grading waveguide location, suitably at or close to the central region of the grating waveguide array, to respective locations at opposite sides of the grating waveguide array. The rate of sequential decrease in the radii of curvature of said curved portions may be modified to result in preferential attenuation of optical signal reflection at said curved portions located near the edges of the grating waveguide array to implement apodization.

By implementation of features of the invention, an optical waveguide device can be designed which is particularly compact. For example the overall length of the optical waveguide grating readily can be designed to be less than the overall length of the free space region, both measured along the general direction of transmission of light wave signals.

Structures embodying the invention may be used to implement a WDM device capable of handling a larger number of channels (e.g. 40 channels with a channel separation as close as 50–100 GHz) while giving rise to low cross talk between adjacent channels (e.g. less than 50 db) and significantly reduced variation of transmission efficiency across the response spectrum of the device. An important contribution to the improved functionality device is the decoupling of the waveguide sections along the length of the waveguide grating, and in particular at the ends of the waveguide sections at the waveguide slab end. The particular mode of deployment of the tapered waveguide sections described above significantly contributes to this desired separation without adversely affecting overall transmission efficiency.

BRIEF DESCRIPTION OF THE DRAWINGS

Various features and advantages of the invention will be apparent from the following more detailed description of an embodiment of the invention, provided by way of example, with reference to the accompanying drawings, in which.

DETAILED DESCRIPTION OF EMBODIMENTS OF THE INVENTION

By way of example, a particular design of an optical waveguide grating based multiplexer and demultiplexer embodying various aspects of the invention will be described. It is to be understood that other WDM designs as well as other optical waveguide based devices, e.g. routers, channel drop filters, employing one or more of the various aspects of the invention may also be constructed.

Figure 1:
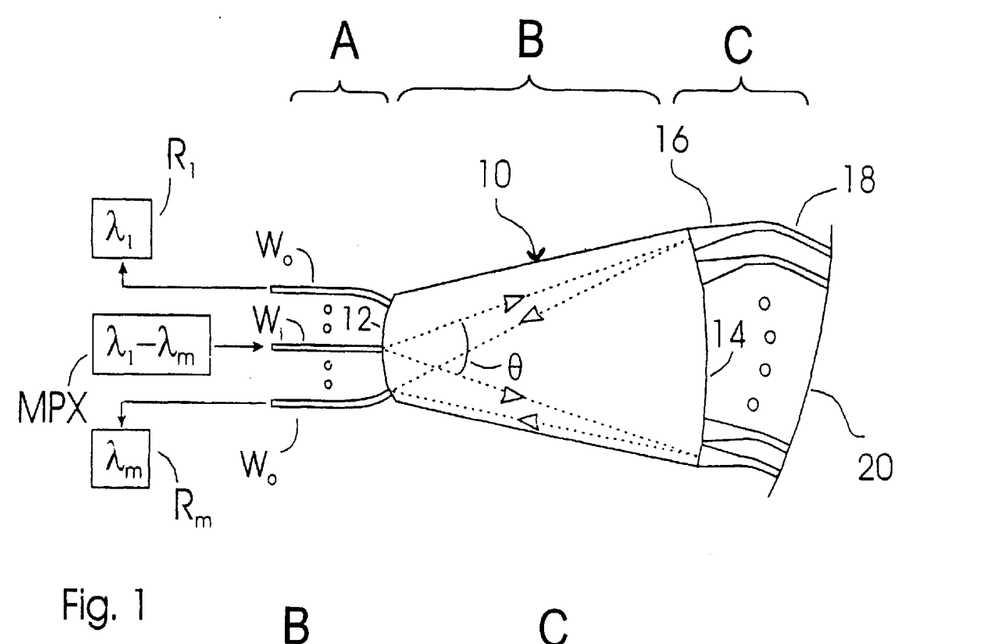
FIG. 1 is a schematic drawing of a multiplexer/demultiplexer embodying features of the invention.
Figure 2:
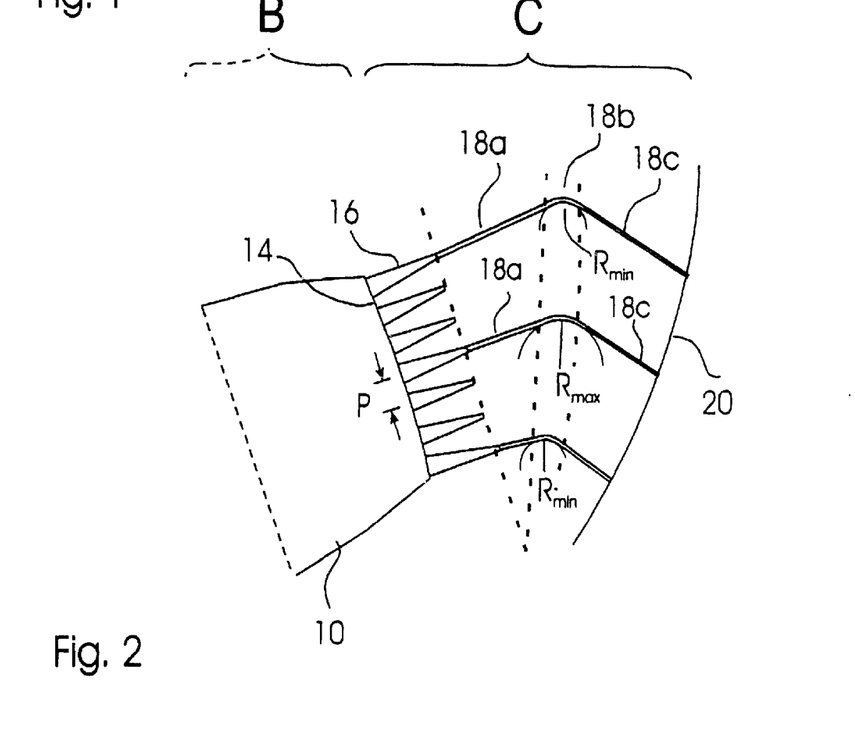
FIG. 2 is a more detailed schematic diagram of the grating section.

The optical waveguide WDM device depicted in FIGS. 1 and 2 comprises three main parts, an input-output optical waveguide structure A; a free space propagation region B; and a reflective optical waveguide grating C, including a continuous reflecting surface.

The input-output waveguide structure A includes an input optical waveguide Wi and a number m of output optical waveguides Wo spaced apart on either side of the waveguide Wi which may be located at or near the center of the array of output waveguides Wo. The particular number of channels, and hence input waveguides Wi, depends on the practical bandwidth of associated optical amplifiers and the practical separation between channels with an acceptable cross-talk level. For example, assuming an optical amplifier total bandwidth of about 32 nm and a channel separation of 0.8 nm (100 GHz), up to 40 channels could be accommodated. The waveguides Wi and Wo interface with and extend radially from an arcuate first end surface 12 of a slab waveguide structure 10 which provides the free space region B. The waveguides Wi and Wo provide ports for communicating light waves to and from the slab waveguide 10. Typically, the output waveguides Wo are symmetrically arranged on both sides of the input waveguide Wi, but this not essential; the input waveguide could be disposed at any other convenient location on the end surface 12 of the slab waveguide.

The slab waveguide 10 has a second arcuate end surface 14, disposed opposite from the first end surface 12. The second arcuate surface 14 interfaces with a larger number n, for example 200, of laterally spaced tapered optical waveguide sections 16 which extend radially from the second arcuate surface 14 and taper from wider ends at the interface with the second surface 14, to narrower ends more remote from the second surface 14. The wider ends of the tapered waveguide sections 16 are more closely spaced from each other than are the narrower ends. At the interface between the wider ends of the tapered sections 16 and the slab end surface 14, light is confined within the tapered sections and throughout the lengths of the respective tapers, there is essentially no optical coupling between them.

The optical reflective waveguide grating structure C includes the tapered waveguide sections 16, the narrower ends of which are continued as an array of n laterally spaced apart waveguide sections 18, each of which terminates at a continuous reflector surface 20, conveniently fabricated as a multilevel dielectric deposited on a polished surface. The tapered waveguide sections 16 have tapers which are identically shaped and dimensioned. The waveguide sections 18 include straight portions 18a, having essentially the same width as each other and different lengths, which are continuations of the narrower ends of the tapered waveguide sections 16. The waveguide sections 18 also include curved portions 18b which have different radii of curvature with the greatest radius of curvature associated with the center waveguide section 18 (i.e. on each side of the center waveguide section 18, there is an equal number of waveguide sections). Portions 18c of the waveguide sections 18 extend from and tangentially to the curved portions 18b, each terminating at the reflector surface 20.

A set of m optical signals, having different individual wavelengths, which have been multiplexed together by a multiplexer MPX (e.g. at a communications switching center or transmitter) external of the WDM device are communicated, e.g. by an optical fiber, to the input waveguide Wi and are diffracted as they travel across the free space region provided by the waveguide slab 10, from the first arcuate end surface 12 to the wider ends of the respective tapered waveguide sections located at the second arcuate end surface 14. The optical signals are then communicated along the respective optically isolated grating waveguide sections 18, reflected from the reflector surface 20, returned along the grating waveguide sections 18 from the narrower ends to the wider ends of the tapered waveguide sections and are then propagated in respective channels as demultiplexed optical signals to illuminate respective ones of the output optical waveguides Wo, which may be connected directly or via other networks to appropriate receivers R1–Rm. Conversely, m individual single wavelength optical signals could be fed as channel inputs to the waveguides Wo and after propagation to and from the reflector surface 20, along the slab waveguide 10 and grating waveguide structure 18, emerge at the waveguide Wi as a multiplexed set of m optical signals.

The waveguide sections Wi, Wo, the slab waveguide 10, the tapered waveguide sections 16, and the grating waveguide sections 18 conveniently may be constructed as an integrated structure comprising a substrate on which has been formed a dielectric waveguide arrangement, generally indicated 11, comprising a propagation core of high refractive index material sandwiched between cladding layers of low refractive index material. In one embodiment, a silicon substrate may be used with the cladding and core layers defined by differently doped silica layers. Alternatively, semiconductor heterostructures could be used employing, for example a core layer of indium/gallium phosphide and cladding layers of indium phosphide.

Light waves transmitted through the slab waveguide 10 are propagated in two dimensions with light signals confined essentially in the core layer of the dielectric waveguide, which extends over the substrate as a continuous layer 11, the vertical dimension (thickness) of which (perpendicular to the plane of FIG. 1) is such that single mode waveguide transmission of light waves is assured. Using a silica-on-silicon slab waveguide structure, this dimension is typically about 5 microns. The difference in refractive index (hereafter sometimes referred to simply as 'index') between the core (doped silica) and cladding (undoped or differently doped silica) materials is typically 0.5 to 0.7%. In the lateral dimension (essentially bound by the periphery of the waveguide slab) there is no confinement. In the device described here light waves enter the slab region 10 through the input waveguide Wi. The light waves then expand radially, in the lateral dimension, due to diffraction, and couple to the tapered waveguide sections 16 and the waveguide grating sections 18 of the waveguide grating section C, defined by laterally spaced apart, equal width, strips of the core material covered by cladding material. The interface between the input-output waveguide structure Wi, Wo and the slab waveguide end surface 12 (interface arc I), as well as the interface between the slab waveguide end surface 14 and the tapered waveguide sections 16, (interface arc II), should each form an arc of a circle. The two circles preferably have the same radius R. The center of the interface arc I is located on the interface arc II, and vice versa. Preferably the radius R is 3–5 cm.

The specific choice of the interface arc radii impacts the design of the grating section C and the overall performance of the WDM device, and will be discussed in more detail below.

The input-output waveguide structure includes one input waveguide Wi and a number m (typically 16–40) output waveguides Wo. At the interface with the surface 12 (interface arc I), all of these waveguides must extend perpendicularly to this arc. At this point the separation (dw) between neighboring waveguides of the array of waveguides Wi, Wo, is at a minimum. The waveguides Wi, Wo then fan out from the arcuate surface 12 to provide convenient couplings to input and output optical fibers (not shown). The radius of curvature of each waveguide section 18b must be sufficient to minimize and ideally (i.e. absent any intended correction) to avoid radiation losses. In an exemplary design this value would be approximately 10–15 mm.

The separation dimension dw, is selected for minimization of side-by-side coupling between adjacent single mode waveguide sections. The amount of coupling is determined by the mode confinement (i.e. the fraction of light intensity propagated) in the waveguide core and the distance between adjacent waveguide sections. Such coupling contributes to cross-talk between channels and is highly undesirable. Based on a silica-on-silicon waveguide structure, the center-to-center distance dibs preferably greater than 25 microns.

Figure 3:
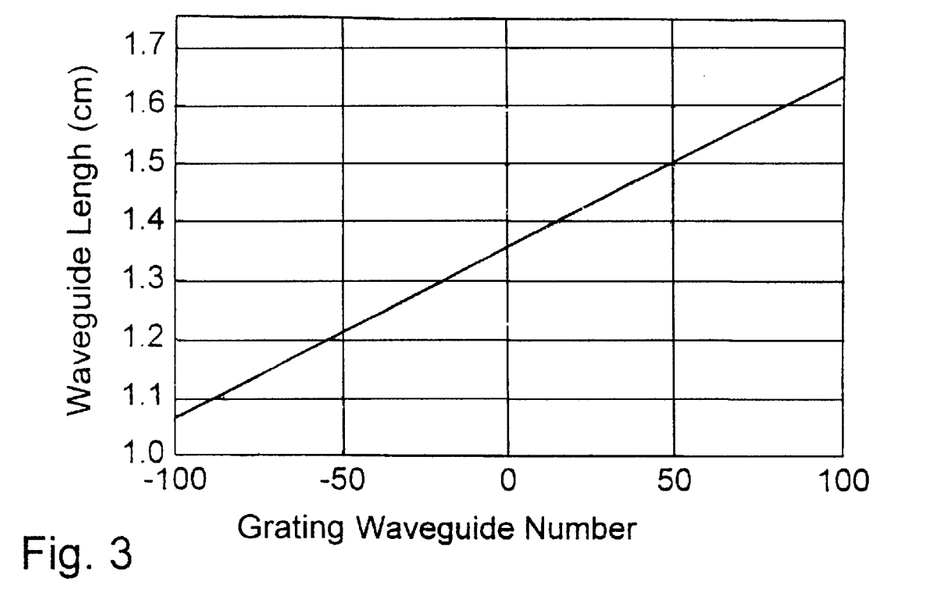
FIG. 3 is a plot of the length of waveguide in the grating section as a function of the waveguide number.

In the design of the optical waveguide grating structure illustrated in FIGS. 1 and 2, the interface surface 14 (interface arc II) forms an arc of radius R, as discussed above. The origin of this interface arc II is placed at the interface surface 12 (interface arc I). This allows for precise focusing of light propagating from the waveguide grating structure C along the waveguide slab 10 to the output waveguides Wo. For all wavelengths of light, this design results in output spots, the intensity distribution at the interface arc I, of practically the same size as that of the intensity distribution at the input waveguides Wi. This is illustrated in FIG. 3 and discussed below. This is crucial to increased efficiency and high resolution of the WDM structure. Deviation from this focusing arrangement may result in the loss of intensity and increased crosstalk between channels.

Considering in more detail the design of the array of tapered waveguide sections 16 and grating waveguide sections 18 in region C. Each tapered waveguide section 16 extends radially from, i.e. perpendicularly to, the interface arc II at the waveguide slab surface 14. All the tapered waveguide sections 16 have the same dimensions (length and shape). The shape of the taper is chosen to minimize optical losses. At the interface surface 14, the wider ends of the tapered waveguide sections are close together, e.g. within 2–4 $\mu$m. At the arcuate surface 14, the tapers are quite wide, ~30 um, tapering down to ~7 $\mu$m which is the same width as the single mode waveguide sections 18, and the fundamental mode of the propagating light is confined to the core region of the taper. The length of the tapered sections is ~1–2 mm, selected to minimize losses and to provide a compact structure. As a consequence, the coupling between neighboring tapered waveguide sections 16 (along the lengths thereof) and between neighboring waveguide sections 18, is negligibly small. The minimum spacing (center-to-center) is 25 $\mu$m, based on the same criteria applicable to dw, as discussed above. This substantially complete decoupling between the grating waveguide sections 18, as well as precise positioning of the interface arcs I and II, as described above, minimizes aberrations in the optical field distribution at the interface arc I. Otherwise, such interactions could strongly degrade resolution of the device. Thus, while the tapered section waveguide sections 16 function in conventional manner to efficiently collect the light originating at the interface arc I and propagating through the slab waveguide 10, in the WDM shown in FIGS. 1 and 2, an additional and novel function of the tapered waveguide sections 16 is to provide rapid separation between the narrow ends of the tapered waveguide sections 16 to achieve adequate lateral spacing for optical isolation between individual single mode waveguide sections 18 comprising the grating section C.

The waveguide sections 18 (e.g. 200 in number) of the optical waveguide grating section C each includes a straight single mode waveguide portion 18a, directed radially outwards with respect to the slab waveguide surface 14. The length increments di of neighboring single mode waveguide sections 18a are carefully determined as discussed below. The waveguide portions 18a continue into curved single mode waveguide portions 18b having carefully controlled radii of curvature. Single mode, straight waveguide portions 18c extend as tangential continuations of the curved waveguide portions 18b and are directed perpendicular to the cylindrical reflector surface 20.

The number of waveguides 18 in section C is determined by the required resolution and the grating order M, defined as the number of wavelengths of light fitting into the waveguide grating length increment di. The resolution is determined by the product of n (number of waveguides in the grating) and M. In this sense, the larger the number of wavelengths to be resolved, i.e. the number of channels m, the larger the number of waveguides in the grating. For example, there might be about 4 to 8 times as many grating waveguides as there are channels. In the high resolution device discussed here 300>=n>=150, with n=200 being a representative design choice.

Consider, for simplicity, an input waveguide Wi placed at the center of interface arc I (surface 12) and, consequently, at the origin of interface arc II (surface 14). In this case, light waves entering the grating region C have the same phase for all waveguide sections 18 of the grating. Since the grating waveguide sections 18 are unequal in length from each other, the optical round trip path from the input waveguide Wi to the reflector surface 20 and back to each output waveguide Wo is different for each waveguide section 18, resulting in a phase shifts along each round trip path. The phase shift between neighboring waveguide sections 18 depends on the light wavelength in the respective channels, the length increment di, and the effective refractive index of the optical waveguide. The phase shift increment is constant across the grating region C and, for each light wave returning back to the interface arc I (surface 12), results in the rotation of the wavefront. Thus the focal point of the returning waves will be shifted on the interface arc I, with the shift depending on the wavelength.

The shift per unit wavelength increment, known as linear dispersion, is an important measure of the overall WDM device performance. For any particular application, the WDM device is designed for a fixed set of channel wavelengths, e.g. 1.53–1.562 $\mu$m. Each of these wavelengths is focused at a different point of the interface arc I (surface 12). The output waveguides Wo are placed precisely at these focal points.

Large values of linear dispersion assure large angular separation between adjacent channel wavelengths and result in high resolution and low cross talk. For instance, a design value of linear dispersion of 34 $\mu$m for a 100 GHz (0.8 nm) channel spacing may be calculated. These values are applicable for a specific design of the slab waveguide 10 with the interface arcs I and II radii equal to 3.5 cm. FIG. 3 shows the total waveguide length in the grating section C (i.e. 18$a$+18$b$+18$c$) vs. waveguide number used in this design calculation, numbered from the center waveguide section towards the peripheral waveguides. FIG. 3 is based on a waveguide-to-waveguide length increment di of 30 $\mu$m.

The entire WDM waveguide grating can be designed as a very compact overall structure, to fit into a region of about 2×2 cm. Such a WDM grating structure can be printed using a single field exposure of a UV stepper, a lithographic tool common in the modern silicon chip manufacturing practices.

As noted above, the choice of the common radius R for the curved surfaces 12 and 14 (interface arcs I and II) of the slab waveguide 10 is important. The linear dispersion of the WDM device is proportional to the degree of rotation of the wavefront transmitted between the input port Wi and the output ports Wo, as described above, and the radius R. The degree of rotation of the wavefront is proportional to the waveguide length increment. The linear dispersion is then proportional to the product di.R. Since the pitch of the optical waveguide grating section C is fixed, the number of waveguides n in the grating is also proportional to R. In other words the linear dispersion is proportional to di.n, which is the difference between the longest and shortest waveguide sections 18 of the grating section C. In the design under discussion, as illustrated in FIG. 3, di.n=0.6 cm.

For a number of reasons, ranging from the ease of manufacturing to lower losses, it is desirable to have compact grating section C. A compact grating is defined here as a grating in which di.n is comparable to the length of the shortest waveguide section 18 in the grating section C, Lmin. In a compact grating based on the FIG. 3 parameters, the ratio of d.in/Lmin may be greater than 0.5.

The above description of the grating section C has been based on waveguide sections 18 having different physical lengths, with a physical length increment di between neighboring waveguide sections. However, in a grating design employing curved waveguide sections 18, it has been discovered that it is preferable to adjust the lengths of the waveguide sections according to the optical path lengths of the overall waveguide sections (18$a$+18$b$+18$c$) rather than on the physical path lengths. Neighboring waveguide sections are designed to differ by a constant increment in optical path length. The optical path length is measured as the integral of the effective refractive index over the length of the overall waveguide section 18 so that each waveguide section of the grating requires a different correction because of its individual radius of curvature and different length of its curved section from neighboring waveguide sections. Using this design approach, more precise control of phase shift along respective waveguide sections 18 can be achieved, and radiation (and hence optical signal) loss, and undesired phase change dependency on the refractive index of a curved waveguide section with change in curvature, may be minimized. Further, it is not essential that the radius of curvature of the waveguide sections 18$b$ decreases from the center (or near center) waveguide section 18 to the peripheral waveguide sections; alternatively, the radius of curvature could increase from Rmin at one peripheral waveguide section 18 to Rmax at the peripheral waveguide section on the opposite side of the waveguide grating section C.

The WDM design described and illustrated herein achieves a compact grating and high linear dispersion by rapidly separating adjacent waveguide sections 18, by virtue of the deployment of the tapered waveguide sections 16, and designing a linear increase in the length of the straight single mode sections 18$a$ in section C with the waveguide sequence number, from the shortest to the longest. In a straight waveguide section the optical path is equal to the product of the section length and the refractive index. This results in an uncoupled grating, i.e. effectively zero coupling between neighboring waveguide sections, even at the wider ends of the tapered waveguide sections 16 at the interface arc II, the interface between the slab waveguide surface 14 and the tapered waveguide sections 16. This also allows use of a simple reflecting surface 20, for instance a cylindrical surface with an arbitrary radius of curvature, without any need for surface steps that are difficult to fabricate. Reasonably compact grating sections C can be also achieved with a flat mirror (a cylindrical surface of infinite radius) that is easiest to fabricate. This is the surface used in the simulation results depicted in FIGS. 3–6.

By placing the required incremental length increase into the first straight sections 18$a$ of the grating section C, the curved waveguide sections 18$b$ may then be designed for the overall compactness of the grating section C. This is obtained when the maximum radius of curvature Rmax is placed at the waveguide portion 18$b$ at the center of the grating section C, with the radius of curvature decreasing (curvature increasing) as the waveguide sequence number increases from the center waveguide portion 18$b$ to each opposite peripheral side of the grating section C. Preferably, the curvature of each curved waveguide portion 18$b$ is an approximately parabolic function of the grating section waveguide number, i.e. plotting the waveguide sequence number commencing from a reference waveguide portion 18b generates a parabolic curve with its origin at the reference waveguide section. Consequently, the origin of this parabola is preferably placed at a waveguide portion 18b located at or close to the center of the array of grating waveguides 18. This choice maximizes the device efficiency, without affecting resolution. With this design of the grating it is possible to achieve a desired din/Lmin ratio. However, a less compact grating could be constructed using as the reference waveguide portion, one of the curved waveguide portions located at one side of the grating array so that the curvatures of the waveguide portions increase parabolically from that side of the array to the opposite side.

Reference to the "center" waveguide portion 18b is not intended necessarily to be geometrically precise and comprehends any conveniently located curved portion 18b of a grating waveguide 18 at or near the center of the grating waveguide array, so that there may be a symmetrical or asymmetrical disposition of grating waveguides about the "center" or reference waveguide. Also, the expression contemplates an arrangement in which there may more than one "center" waveguide. For example, in the embodiment under discussion, there are 200 grating waveguides 18 and there could be two neighboring reference waveguides each having a curved portion 18b with the radius of curvature value Rmax, and an equal number of grating waveguides on either side.

A typical feature of prior art waveguide grating designs provides for strong coupling between waveguides at the interface of the slab region 10 and the waveguide grating, interface arc II. The strong coupling limit, where single mode waveguides are spaced very close together, provides for the excitation of a fundamental mode of the entire waveguide grating. For a limited (i.e. small) number of optical channels this condition maximizes throughput. However, the narrow gaps between waveguides required by strong coupling lead to fabrication problems. Tapered waveguide transitions also have been proposed between a slab region and a waveguide grating, in which the tapered waveguides are dimensioned for enhancement of wave transmission throughput. Again. the resultant close spacing between tapered waveguides has resulted in fabrication problems.

In the embodiment of the invention described with reference to FIGS. 1 and 2, the tapered waveguide sections are used to achieve a different objective, i.e. to maximize decoupling between neighboring waveguide sections. Surprisingly, a significant decrease in efficiency does not result and spacings between tapered waveguide sections are adequate to accommodate fabrication requirements.

Consider, again, an input waveguide Wi located at the center of interface arc I. In the strong coupling limit, when grating waveguides at the surface 14 nearly touch each other, the channel response is ideally described by a function:

$$\frac{\sin^2(y)}{y^2}, \quad \text{where } y = \frac{\pi}{2}\frac{xn\alpha}{\lambda} \qquad (1)$$

here xn is the position of the nth output waveguide Wo at the interface arc I, relative to the center of the arc, λ is the wavelength of light, and α is the angular aperture of the grating element. In other words, α is the ratio of the grating pitch to the radius R of the slab waveguide region 10. The grating pitch p is the center-to-center distance between neighboring taper sections at the surface 14 of FIG. 2. In an exemplary design, p=34 μm, R=3.5 cm, and α~10⁻³.

Figure 4:
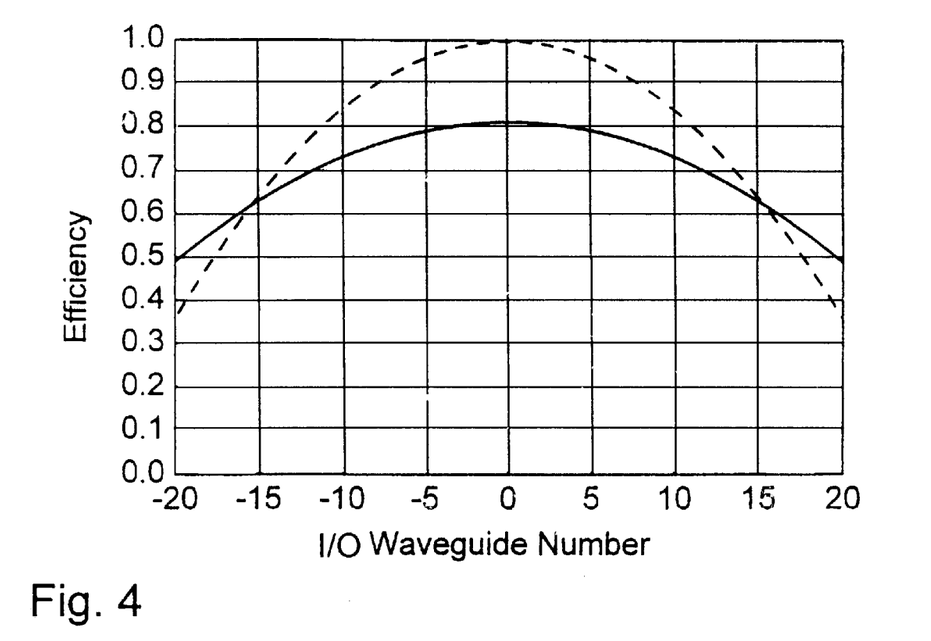
FIG. 4 is a plot of the channel response function for a strongly coupled (broken line), and uncoupled (solid line), waveguide at the interface arc 14 (FIG. 1)

The response function represented by equation (1) is plotted by a dashed line in FIG. 4. For light of the wavelength coupled to an output waveguide Wo close to the central waveguide Wi, the calculated throughput approaches unity. In this case, the coupling to the grating is high and light returns from the grating to the interface arc I by first order diffraction. For waveguides far from Wi, the throughput drops dramatically. In this case, the ratio of the useful first order diffraction to higher orders diffraction, which are focused outside of the useful range of the interface arc I, is very small. This happens because for wavelengths far from the central wavelength the intensity of the first order diffraction is low, and the WDM device produces an overall response which is strongly wavelength sensitive. In most applications, flat response is needed and it is obtained by introducing extrinsic loss for central channels, a process of leveling down to the throughput of peripheral channels. In other words, the practical throughput is limited by peripheral channels.

On the other hand, in the decoupled limit obtained by the introduction of carefully designed tapers, the response function is given by $$\cos^2(y)\cdot\left(\frac{8}{\pi^2-4y^2}\right)^2 \qquad (2)$$

where y is the same argument as in equation (1). This function, plotted as a solid line in FIG. 4, is less peaked. The first component of loss, the coupling to the waveguide grating C, is decreased by ~1.8 dB. However, the high order diffraction is smaller, producing a flatter throughput characteristic. The overall WDM device response becomes much less channel dependent. While the throughput of peripheral channels is similar in both cases, in the decoupled limit there are no aberrations.

Finally, an important design parameter for the second straight sections 18c of the single mode waveguide sections 18, is to assure that these waveguide sections are perpendicular to the reflecting surface 20. The lengths of the waveguide sections 18c is influenced largely by manufacturing convenience.

Figure 5A:
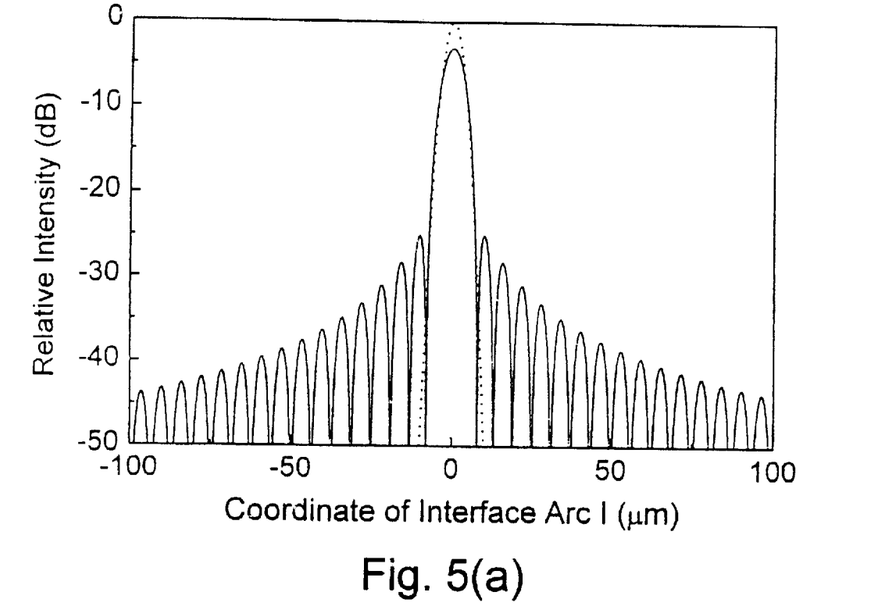
FIGS. 5a and 5b (depict computer simulated characteristics of a multiplexing and demultiplexing device as shown in FIGS. 1 and 2.
Figure 5B:
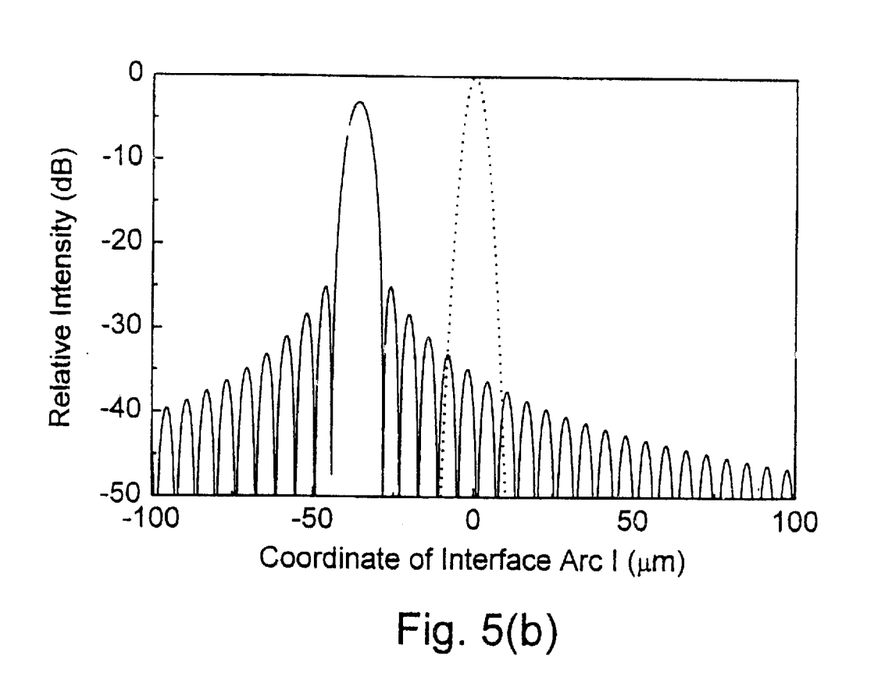

Representative levels of performance that may be achieved using a design as described with reference to FIGS. 1–4, will be discussed with reference to FIGS. 5a and 5b which show the results of computer simulations of operation of such a WDM device. In FIG. 5(a) the distribution of intensity of the input field as a function of the input arc coordinate at the surface 12, is depicted by a dashed line. The solid line plot shows the distribution of the field intensity returned from the grating, over the input arc of the surface 12. The propagation of light illustrating this example is shown in FIGS. 5a and 5b. Light with the intensity distribution shown by the dashed lines in FIGS. 5a and 5b originates at the waveguide Wi and the interface arc I, surface 12. It propagates through the slab waveguide B and the waveguide grating C and is then reflected from the surface 20, propagates in the reverse direction through the waveguide grating section C and the slab waveguide B and is refocused at the output waveguides Wo, as indicated by dotted lines in FIG. 1. The intensity distribution of the light returned to the interface arc I is plotted as a solid line in FIG. 5a. In order to compare the two distributions a wavelength of light for which the initial and returned fields overlap is chosen. In the example illustrated, this wavelength is 1.5454 μm. The main peaks for the incident and returned fields have the same width, demonstrating diffraction limited design. This accurate preservation of the initial field distribution is also known as aberration free operation. The reflected field is attenuated by 2.1 dB, an acceptable loss.

FIG. 5(b) compares the two light intensity distributions for a wavelength of 1.5454 µm shifted by 0.8 nm or 100 GHz. The refocused spot is shifted by 34 µm on the interface arc I, as mentioned above. This is consistent with requirements of decoupling of the output waveguides.

An additional feature present in the returned light intensity distributions of FIGS. 5a and 5b is the number of fringes spread out over wide range of the input arc coordinate. These fringes, about 25 dB below the field maximum, clearly overlap the adjacent output channel and contribute to cross-talk. The physical origin of these fringes is thus of interest.

In order to reveal the physical origin of the fringes a simple device may be simulated in which the waveguide grating is replaced by a cylindrical mirror at the interface arc II. Surprisingly, this simulation produces similar fringes. In the theory of diffraction the edges of a mirror act as point sources of diffracted waves. Reflection from a flat mirror would result in diffracted beams originating at the edges. The diffracted beams would be, however, spatially separated and there would be no interference fringes. Reflection from a cylindrical mirror brings the two diffracted beams together at the interface arc I, resulting in interference fringes. The well known physics of diffraction indicates that the intensity of the fringes is proportional to the intensity of light reflected from the vicinity of the mirror edges. In the case of reflection from a waveguide grating, section C in FIGS. 1 and 2, the situation is similar. Light returned from waveguide sections 18 at the periphery of the grating section C contributes disproportionately to the intensity distribution at the output waveguides Wo, plotted as a solid line in FIG. 5b.

This interpretation of the physical origin of the fringes has important practical consequences. The intensity distribution of light at the interface arc II, diffracted out from the input waveguide Wi, decreases from the center of the arc II to its edges. It can be calculated that about 96% of the input light intensity is contained within the angle θ, equal to 0.17 radians in the example under discussion. The remaining 4% is diffracted out of the WDM device. However, if the distribution of light intensity within the angle θ is considered, the intensity at the periphery is lower by only 10 db compared to the center of the beam. The 10 db reduction in the light intensity reflected from the edges of the waveguide grating C is not sufficient to suppress interference fringes.

Two design choices may be considered. One is to make the grating much wider than what is needed for efficient collection of light. The other choice is to preferentially attenuate the edge reflection, to apodize the grating, by some additional means. The latter is more practical. The radii of curvature of the waveguide sections 18b in the waveguide grating section C decrease from the center waveguide section 18b to the peripheral or edge waveguide sections 18b. The radiation loss from a particular curved waveguide section 18b is exponentially dependent on its radius of curvature. Efficient apodization can be incorporated into the waveguide grating by selecting an appropriate ratio of the radii of curvature of the central and peripheral waveguide portions 18b. For example, the radius of curvature of a grating waveguide section 18b would be decreased in a predetermined manner from ~15 mm at the center waveguide to ~5 mm for waveguides at the opposite edges of the waveguide grating, i.e. a radii of curvature ratio of about 3:1 between the center and edge waveguide portions 18b, so that the approximately parabolic relation between waveguide sequence number and curvature is relaxed. In the absence of apodization, the waveguide radius at the edge waveguides would not be smaller than ~10 mm. The radii of curvature ratio selected for a particular application is a tradeoff between improved resolution and losses that are introduced.

Figure 6:
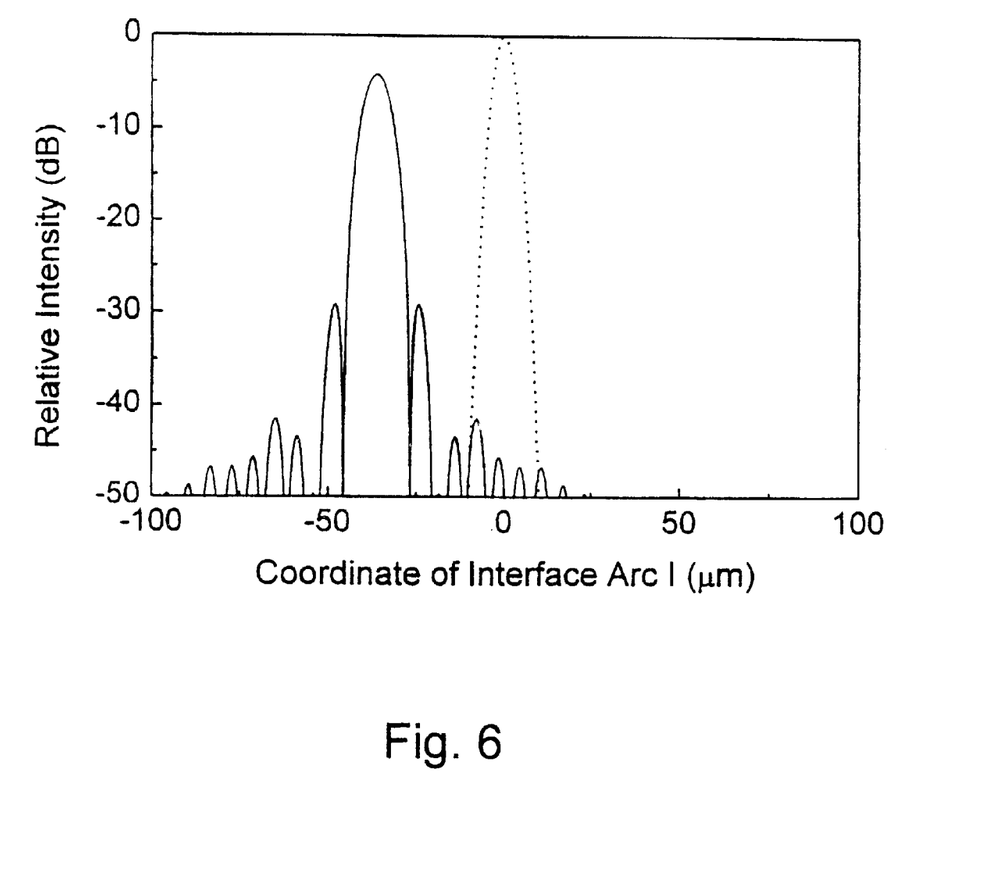
FIG. 6 depicts distributions of the input and output field intensities plotted, as a function of the waveguide slab surface input arc coordinate, for an apodized grating.

Apodization has a dramatically advantageous effect on cross-talk. FIG. 6 shows the result of computer simulation of distribution of the input and output field intensities plotted, as a function of the input arc (interface arc I) coordinate, for an apodized waveguide grating. The intensity of diffraction fringes can be reduced from −30 dB to −45 to −50 dB. At the same time the intensity of the central peak may be reduced by less than ~10 dB.

The optical waveguide structure described above with reference to the drawings could be adapted for applications other than a multiplexer/demultiplexer. For example, two structures as described with reference to FIGS. 1 and 2, but without reflectors 20, could be located with their respective waveguide grating sections 18 coupled together such that multiplexed optical signals applied to the input waveguide Wi of one structure appear as demultiplexed signals at individual output waveguides Wo of the other structure. The overall lengths of the waveguide sections 18 would be dimensioned to provide the required optical path lengths and optical path length differences along the waveguide grating section. Incorporation of two sets of curved waveguide sections 18b could be optional. The structure described with reference to FIGS. 1 and 2 also could be used as a router, with add/drop facility. The add/drop function could be implemented by using two WDM devices. The first device would be used to demultiplex the incoming signal (fed to input waveguide Wi) into individual wavelengths, each directed to a different output waveguide Wo. Once demultiplexed, any wavelength could be dropped. The remaining wavelengths could be multiplexed together by the second WDM device, (i.e. input to waveguides Wo and output from waveguides Wi of the second WDM device). In this process additional wavelengths can be added, implementing the add function. The add and drop functions can be implemented by connecting the appropriate waveguides together or by introducing an optical switch allowing for selection of any wavelength to be added or dropped.

Devices embodying the invention have particular application in or associated with equipment used in optical fiber based communication networks, for example local or long distance telephone networks, to generate and transmit optical communication signals through such networks.

While a particular structure has been described and illustrated to exemplify the invention and how it may be put into effect, it is contemplated that various changes may be made within the scope of the appended claims.

What is claimed is:

1. An optical waveguide device comprising:
    a free space region having first and second arcuate end surfaces, a plurality of optical signal ports located on said first arcuate end surface for coupling to input waveguide sections, said arcuate first end surface having a radius of curvature originating on the arcuate second end surface; and said arcuate second end surface having a radius of curvature originating on the first arcuate end surface;
    a reflector surface; and
    an optical waveguide grating comprising tapered optical waveguide sections spaced apart from each other and extending radially from said second arcuate end surface of the free space region, each of the tapered optical waveguide sections having a wider end adjacent to the free space region and an opposite, narrower end; and an array of laterally spaced apart, optical grating waveguides extending between the narrower ends of the respective tapered optical waveguide sections and the reflector surface, each of the grating waveguides differing in length from a neighboring grating waveguide by a constant increment, and wherein said grating waveguides include intermediate curved portions having respective curvatures which increase progressively according to the sequential location of the grating waveguides from a reference grating waveguide in said array.

2. An optical waveguide device according to claim 1, wherein the tapered waveguide sections and the grating waveguides are laterally spaced apart sufficiently to provide optically isolated transmission paths for light waves between said free space region and said reflector surface.

3. An optical waveguide device according to claim 1, wherein the tapered waveguide sections are configured to enhance collection of light waves transmitted across the free space region from at least one of said ports and to separate the collected light waves into optically isolated paths.

4. An optical waveguide device according to claim 1, wherein the free space region is defined by layers of dielectric materials on a substrate.

5. An optical waveguide device according to claim 4, wherein said dielectric material comprises silica.

6. An optical waveguide device according to claim 1, wherein said free space region, said tapered waveguide sections and said grating waveguides are defined by high refractive index core material sandwiched between low refractive index cladding materials.

7. An optical waveguide device according to claim 1, wherein the reflector surface is a continuous surface and wherein grating waveguide portions extending along paths tangential to the respective curved portions are terminated at and perpendicular to the reflector surface.

8. An optical waveguide device according to claim 1, wherein said optical signal ports are operably associated with m light wave channels, wherein there are n grating waveguides and n is about 4 to 8 times greater than m.

9. An optical waveguide device according to claim 1, wherein the ratio of the difference in length between the longest and shortest grating waveguides to the length of the shortest grating waveguide does not exceed unity.

10. An optical waveguide device according to claim 9, wherein said ratio exceeds 0.5.

11. An optical waveguide device according to claim 1, wherein neighboring ones of said grating waveguides differ in optical path length from each other by a constant optical path length increment.

12. An optical waveguide device according to claim 1, wherein said waveguide grating comprises an array of grating waveguides which progressively increase in length by said constant increment from one side of the array to an opposite side of the array.

13. An optical waveguide device comprising:
a free space region having opposite end surfaces and a plurality of optical signal ports at one of the end surfaces for coupling to waveguide sections;
a reflector surface; and
an optical waveguide grating comprising tapered optical waveguide sections spaced apart from each other and extending from the opposite end surface of the free space region, each of the tapered optical waveguide sections having a wider end adjacent to the free space region and an opposite, narrower end; and an array of laterally spaced apart, optical grating waveguides extending between the narrower ends of the respective tapered optical waveguide sections and the reflector surface, each of the grating waveguides differing in length from a neighboring grating waveguide by a constant increment, wherein said grating waveguides include intermediate curved portions having respective curvatures which increase progressively according to the sequential location of the grating waveguides from a reference grating waveguide in said array; and wherein the radii of curvature of said curved portions of the grating waveguides decrease sequentially in magnitude in an approximately parabolic manner from a reference grating waveguide as the numerical sequential location of a said curved portion increases from an intermediate grating waveguide location to respective locations at opposite sides of the grating waveguide array.

14. An optical waveguide device comprising:
a free space region having opposite end surfaces and a plurality of optical signal ports at one of the end surfaces for coupling to waveguide sections;
a reflector surface; and
an optical waveguide grating comprising tapered optical waveguide sections spaced apart from each other and extending from the opposite end surface of the free space region, each of the tapered optical waveguide sections having a wider end adjacent to the free space region and an opposite, narrower end; and an array of laterally spaced apart, optical grating waveguides extending between the narrower ends of the respective tapered optical waveguide sections and the reflector surface, each of the grating waveguides differing in length from a neighboring grating waveguide by a constant increment, wherein said grating waveguides include intermediate curved portions having respective radii of curvature which decrease progressively according to the sequential location of the grating waveguides from a reference grating waveguide in said array; and wherein the rate of sequential decrease in the radii of curvature of said curved portions is selected to result in preferential attenuation of optical signal reflection at said curved portions located near the edges of the grating waveguide array.

15. An optical waveguide device according to claim 1, wherein the overall length of the optical waveguide grating is less than the overall length of the free space region, both measured along the general direction of transmission of light wave signals.

16. An optical waveguide device comprising:
a free space region having an arcuate first end surface and an arcuate second end surface, said arcuate first end surface providing ports for coupling optical signals to and from said free space region;
said arcuate first end surface having a radius originating on the arcuate second end surface, and said arcuate second end surface having a radius originating on the first, arcuate surface;
a common reflector surface;
an optical waveguide grating array comprising tapered optical waveguide sections laterally spaced apart from each other and extending radially from said arcuate second end surface of the free space region, each of the tapered optical waveguide sections having a wider end and an opposite narrower end, and laterally spaced apart, optical grating waveguides extending between the narrower ends of the respective tapered optical waveguide sections and the common reflector surface, each of the grating waveguides differing in length from a neighboring grating waveguide by a constant increment and each said grating waveguide terminating at the common reflector surface substantially perpendicularly thereto;

wherein said grating waveguides include curved portions having different radii of curvature which decrease sequentially from the approximate center of the grating waveguide array to opposite edges thereof.

17. An optical waveguide device according to claim 16, wherein the tapered waveguide sections are configured to enhance collection of light waves transmitted across the free space region from at least one of said ports, the tapered waveguide sections and the grating waveguides being laterally spaced apart sufficiently to provide optically isolated transmission paths for light waves between said free space region and said reflector surface.

18. An optical waveguide device according to claim 16, wherein said free space region, said tapered waveguide sections and said grating waveguides are defined by high refractive index core material sandwiched between low refractive index cladding materials.

19. An optical waveguide device according to claim 16, wherein the reflector surface is a continuous surface and wherein grating waveguide portions extending along paths tangential to the respective curved portions are terminated at and perpendicular to the reflector surface.

20. An optical waveguide device according to claim 16, wherein the ratio of the difference in length between the longest and shortest grating waveguides to the length of the shortest grating waveguide exceeds 0.5.

21. An optical waveguide device according to claim 16, wherein neighboring ones of said grating waveguides differ in optical path length from each other by a constant optical path length increment.

22. An optical waveguide device according to claim 16, wherein the radii of curvature of said curved portions of the grating waveguides increase in an approximately parabolic manner as the numerical sequential location of a said curved portion increases from an approximately central grading waveguide location to respective locations at opposite sides of the grating waveguide array.

23. An optical waveguide device according to claim 22, wherein the rate of sequential decrease in the radii of curvature of said curved portions is modified from said approximately parabolic function to produce preferential attenuation of optical signal reflection at said curved portions located near the edges of the grating waveguide array.

24. An optical waveguide device according to claim 23, wherein the ratio of the radius of curvature of said curved portions of grating waveguides at the central region and at opposite edges of the grating waveguide array is approximately 3:1.

25. An optical waveguide device according to claim 23, wherein the overall length of the optical waveguide grating is less than the overall length of the free space region, both measured along the general direction of transmission of light wave signals.

26. An optical waveguide device comprising:
a slab waveguide free space region having oppositely disposed arcuate first and second end surfaces, said first arcuate end surface providing ports for coupling optical signals in m wavelength channels to and from input and output waveguide sections;

said arcuate first end surface having a radius originating on the arcuate second end surface, and said arcuate second end surface having a radius originating on the first, arcuate surface;

a continuous reflector surface; and an optical waveguide grating comprising tapered optical waveguide sections extending radially from said arcuate second end surface of the slab waveguide, each of the tapered optical waveguide sections having a wider end adjacent to the free space region and an opposite, narrower end; an array of n laterally spaced apart, optical grating waveguides extending between the narrower ends of the respective tapered optical waveguide sections and the common reflector surface, said grating waveguides progressively increasing in optical path length by a predetermined increment from one side of the array to an opposite side of the array, and each said optical grating waveguide terminating at the common reflector surface substantially perpendicularly thereto;

wherein each grating waveguide includes a curved portion having different radii of curvature, said radii of curvature decrease in an approximately parabolic manner according to an increasing numerical sequential location of a said curved portion from an approximately mid-location in said array of grating waveguides to respective locations at opposite sides of said array of grating waveguides.

27. An optical waveguide device according to claim 26, wherein said slab waveguide, said tapered waveguide sections and said grating waveguides are defined by high refractive index core material sandwiched between low refractive index cladding materials.

28. An optical waveguide device according to claim 27, wherein said slab waveguide comprises a layer of said core material having a thickness which confines light wave transmission to single mode transmission in the thickness dimension of said layer.

29. An optical waveguide device according to claim 26, wherein the overall length of the optical waveguide grating is less than the overall length of the free space region, both measured along the general direction of transmission of light wave signals.

30. An optical waveguide device according to claim 26, wherein m is 40 and $300 >= n >= 150$.

31. An optical waveguide device according to claim 26, wherein the rate of sequential decrease in the radii of curvature of said curved portions is modified from said approximately parabolic function to produce preferential attenuation of optical signal reflection at said curved portions located near the edges of the grating waveguide array.

32. An optical waveguide device according to claim 31, wherein the rate of sequential decrease in the radii of curvature of said curved portions is modified from said approximately parabolic function to apodize said grating waveguide array.

33. An optical waveguide device comprising:
a free space region having opposite end surfaces and a plurality of optical signal ports at one of the end surfaces for coupling to waveguide sections;

a reflector surface; and an optical waveguide grating comprising tapered optical waveguide sections spaced apart from each other and extending from the free space region, each of the tapered optical waveguide sections having a wider end adjacent to the free space region and an opposite, narrower end; and an array of laterally spaced apart, optical grating waveguides extending between the narrower ends of the respective tapered optical waveguide sections and the reflector surface, each of the grating waveguides differing in length from a neighboring grating waveguide by a constant increment, and wherein said grating waveguides include intermediate curved portions having respective curvatures which increase progressively according to the sequential location of the grating waveguides from a reference grating waveguide in said array; and wherein the overall length of the optical waveguide grating is less than the overall length of the free space region, both measured along the general direction of transmission of light wave signals.

* * * * *